United States Patent [19]

Charlebois et al.

[11] Patent Number: 4,654,474

[45] Date of Patent: Mar. 31, 1987

[54] FORMING OF CABLE SPLICE CLOSURES

[75] Inventors: Leonard J. Charlebois, Kanata; James R. Scott, Ashton; Ronald R. D'Aoust, Nepean, all of Canada

[73] Assignee: Northern Telecom Limited, Montreal, Canada

[21] Appl. No.: 752,745

[22] Filed: Jul. 8, 1985

[51] Int. Cl.[4] .................. H02G 15/08; H02G 1/14
[52] U.S. Cl. .................. 174/88 R; 156/49; 174/72 R
[58] Field of Search .......... 174/84 R, 88 R, 78, 174/72 R; 156/49

[56] References Cited

U.S. PATENT DOCUMENTS

| 3,753,204 | 8/1973 | Thompson et al. | 174/78 |
| 4,092,488 | 5/1978 | Hayami et al. | 174/84 R |
| 4,164,621 | 8/1979 | Silva | 174/78 |
| 4,322,573 | 3/1982 | Charlebois | 174/72 R |
| 4,490,315 | 12/1984 | Charlebois et al. | 264/40.2 X |
| 4,496,795 | 1/1985 | Konnik | 156/49 X |
| 4,528,419 | 7/1985 | Charlebois et al. | 156/49 X |
| 4,549,039 | 10/1985 | Charlebois et al. | 174/88 R X |
| 4,570,032 | 2/1986 | Charlebois et al. | 156/49 X |

Primary Examiner—Arthur T. Grimley
Assistant Examiner—Morris H. Nimmo
Attorney, Agent, or Firm—R. J. Austin

[57] ABSTRACT

Forming an encapsulated splice region between cable ends in which the splices formed by connecting conductors together are laid onto the jacket of a cable and are sealed from one another. A layer of resilient tape is wrapped around the cable and over the sealing material to seat it tightly onto conductors leading to the splices. A molded encapsulation is then formed around the splice region and the resilient tape, still in resilient condition holds the tight seal onto the conductors and prevents moisture from within the cables from reaching the splices.

13 Claims, 6 Drawing Figures

FORMING OF CABLE SPLICE CLOSURES

This invention relates to the forming of cable splice closures.

A telecommunications cable from a central office and for underground or aerial use comprises a core having a plurality of pairs of individually insulated conductors. There may be up to 3600 pairs of conductors in the core. When laying cable, it is sometimes necessary to join cables together, end-to-end, to achieve a required length of laid cable. Conventionally, in such situations, conductors are spliced together from cable-to-cable by removing the end portions of core surrounding material, i.e. cable sheaths and jackets so that the cores project beyond them, bringing the cable cores close together and then joining the conductor ends to form splices while retaining them between the cable sheaths and jackets. The splices are then sealed and a closure placed over the region of the splices, i.e. to bridge the gap between and extend over the sheaths.

A problem which exists with this conventional method is that inexplicably some moisture paths remain and splices are known to fail because of contact by moisture. It is believed that one possible reason for this is that moisture passes along the inside of cables even though steps are taken to prevent ingress of moisture. Upon the moisture reaching a splice, any connection between conductors which is not perfectly sealed then allows passage of moisture and hence splice failure.

In U.S. Pat. No. 4,528,419 entitled "FORMING CABLE SPLICE CLOSURES" issued to L. J. Charlebois et al, July 9, 1985 there is described a method for forming an encapsulated splice region between two cable ends. In the method described in the aforementioned patent, core surrounding material is removed from end portions of the cables. Conductors of the two cables are then turned outwards and cable end portions are brought closer together and in substantial axial alignment. Conductor splices are then formed between conductors of one cable and those of the other and each splice is located upon an end portion of core surrounding material with conductors extending across the end portion to their respective cable cores. Each individual splice is sealed within sealing material and an encapsulation is formed axially over the end portions of core surrounding material to cover and fluid tightly seal the splices. As described in that patent the splices are enclosed in a heat softenable sealing tape as the sealing material and this sealing tape is provided as wrappings around the core surrounding material of the cable end regions. It is found with the method described in the aforementioned patent that a fluid tight seal is provided around each of the splices for cables up to a certain diameter. However, moisture leaks have been found to occur in a few instances in cables of large diameters, e.g. up to 3600 pairs of conductors. Some improvement is therefore required in the method of sealing the splices.

The present invention provides a method of forming an encapsulated splice region between two cable ends in which the problem of splice failures caused by moisture is eliminated. The invention also provides an assembly of two telecommunications cables with the conductors forming splices which are sealed in a manner so as to solve the moisture leakage problem.

Accordingly, the present invention provides a method of forming an encapsulated splice region joining two cable ends comprising:- removing core surrounding material from end regions of two cables to provide end portions of core surrounding material and cable core regions projecting axially a certain distance beyond slid end portions; turning the conductors of said core regions so that they extend radially outwards from the cables; locating the cable end portions and the end portions of core surrounding material close together and substantially in axial alignment with the conductors projecting from between the end portions; connecting shields of the two cables together with a rigid axially extending grounding means and enclosing the grounding means within a seal; surrounding the seal and the end portions of core surrounding material with a layer of stiffening material with conductor ends projecting radially beyond the stiffening material; with conductor ends electrically connected together to form splices from one cable to the other, individually enclosing each splice within a compressible deformable sealing material which extends over the stiffening layer and onto the outer surface of each cable at each end of the stiffening layer and with the splices located radially outwards of the core surrounding material; applying a layer of a resilient tape material around the deformable sealing material in a position over a portion of the conductors as they extend from their splices axially along the end portions of core surrounding material, the resilient tape material being longitudinally stretched as it is being applied to radially compress the compressibly deformable sealing material into intimate sealing contact with each conductor; and forming a plastic molding encapsulation around the deformable sealing material and resilient tape material, and over cable portions at each axial end of the deformable sealing material, the encapsulation formed at a temperature insufficient to cause the resilient tape material to relax from its stretched condition.

In the above process, the stiffening material serves to hold the end regions of the two cables substantially immovable one relative to the other so as to prevent any slight movement between the deformable sealing material and the conductors extending between the splices and the core regions. In addition to this, there is a positive sealing action between the deformable sealing material and the conductors and which is created by the resilient tape material holding the sealing material permanently in a compressibly deformed condition surrounding each conductor. It follows that a splice region formed by the above method ensures that there is minimal movement between the conductors and the sealing material surrounding them so as to minimize any possibility of moisture moving along the interfacial region between the insulated conductors and the sealing material.

The method of the invention applies to any diameter of cable. If cables of large diameter are to be spliced together, e.g. of 3600 conductor pairs, then the method of the invention is preferably performed by separating the splices into groups and then sealing a first group of splices by locating them around at least one end portion of a cable and placing a layer of resilient tape material upon the deformable sealing material so as to compress the sealing material against the conductors for the first groups of splices. Second and subsequent groups of splices are then positioned between sealing material axially spaced from the first group and layers of resilient tape material are applied in the manner defined according to the invention. Alternatively, layers of sealing material may be placed over the first and subsequent layers of resilient tape material for succeeding groups of splices to be applied directly surrounding the first group.

The invention also includes an assembly of two telecommunications cables disposed end-to-end with conductors of each cable electrically connected each to one conductor of the other cable to form a conductor splice and in which:- shields of the two cables are connected together with a rigid axially extending grounding means which is enclosed within a seal; a layer of stiffening material surrounds the seal and end portions of core surrounding material with conductors projecting radially beyond the stiffening material and having axially extending parts outside the end portion of at least one of the cables to dispose the splices radially outwards of core surrounding material with each splice individually closed within and sealed from other splices by a sealing material and with axially extending parts of the conductors enclosed within and sealed by said sealing material, said sealing material being compressibly deformable; a layer of resilient tape material is wrapped around the sealing material in a position over the axially extending parts of the conductors, the resilient tape material being in a stretched resilient condition circumferentially of the sealing material to apply a radially inwards compressive force upon the sealing material and hold it positively in sealing contact with said conductor parts; and a surrounding molded plastic encapsulation extends from the core surrounding material of one cable to the core surrounding material of the other.

One embodiment of the invention will now be described by way of example, with reference to the accompanying drawings in which:-

Figure 1:
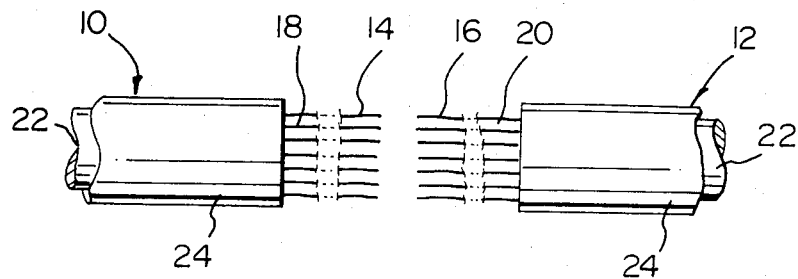
FIG. 1 is a side elevational view of two ends of two cables prepared for splicing together.

As shown in FIG. 1, two cables 10 and 12 each with 900 pairs of conductors are to be joined together by electrically interconnecting each individual conductor 14 and 16 of two cable cores 18 and 20 with an individual conductor of the other cable.

Figure 2:
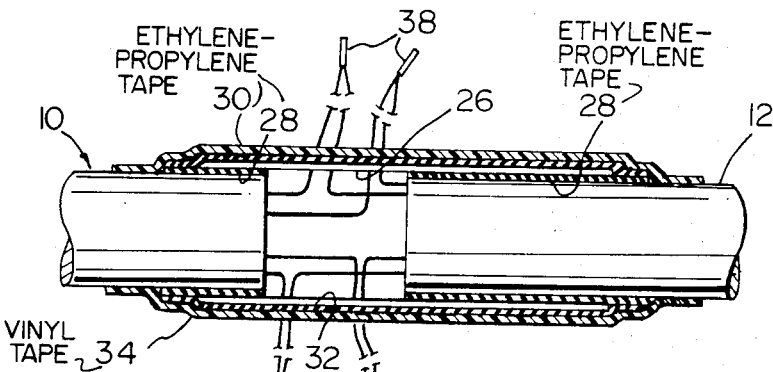
FIGS. 2, 3 and 4 are cross-sectional views of the two cable ends showing different stages in the method of joining.

To enable splices to be formed between the conductors, the core surrounding material of each cable end, namely a metal sheath or shield 22 and polymeric jacket material 24 is removed to expose a projecting portion of the core 18 or 20 extending beyond the end portions of the jacket 24. As will be described, it is necessary in the following of the method according to this invention, to turn the conductors so that they extend axially over one of the jackets 24 to position their splices outside and supported by the jacket. To allow this procedure to be followed, the lengths of conductors extending beyond the jacket and sheath of each cable should be sufficient for this purpose. As shown by FIG. 2, the conductors of each cable are splayed outwardly so that they project in all radial directions from the cables and separation of the conductor pairs is achieved. This operation then enables the cable ends to be disposed substantially in axial alignment with the core surrounding material closer together than would be the case if the cores were left in their condition shown in FIG. 1. The cable ends are in fact brought together in this particular construction so that the jackets 24 are approximately 75 mm apart.

A grounding means in the form of a grounding bar 26 is then positioned so as to bridge the gap between the metal sheaths 22 and is secured to them in conventional fashion to electrically connect them together. As is shown by FIG. 2, the grounding bar 26 extends for a substantial distance along the jacket of the cable 12, this distance being sufficient to enable all of the splices formed between conductors of the two cables to be disposed over this axial distance of the cable. The grounding bar is sealed to prevent any moisture passing along it, by a sealing tape material formed of windings of ethylene-propylene sealing tape which is formed into overlapped wrappings 28 of the tape which are positioned at each cable end and beneath the grounding bar. Further wrappings 30 are then wound on top of the wrappings 28 and also over the grounding bar so as to completely enclose it.

A rigid elongate support means is also provided. This support means is also a metal bar 32 which is circumferentially spaced around the cables from the grounding bar 26 and extends for the full axial distance of the grounding bar as shown in FIG. 2. The metal bar 32 is also sealed within the wrappings 28 and 30 of the sealin tape. Thus the grounding bar and the support means act together to stabilize the two cable ends relative to each other. To assist in the stiffening effect, a stiffening material is added. This stiffening material is in the form of overlapped windings 34 of vinyl tape which extend completely axially across the windings 28 and 30 so as to axially bridge the windings of the sealing tape and also of the grounding bar and the support means 32. The wrappings 34 assist in the stiffening of the connection between the two cable ends so that substantially all of the movement between the two cable ends is eliminated.

Figure 3:
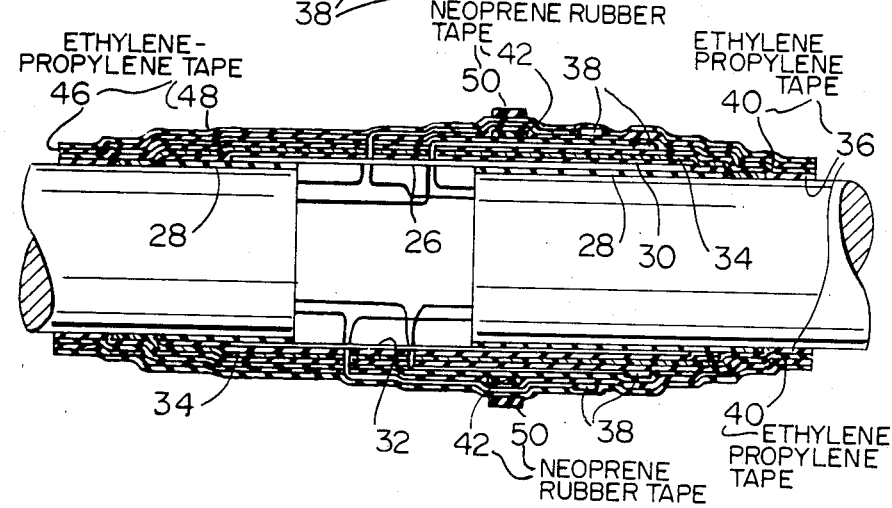

With the conductor ends projecting through the vinyl layer 34 as shown in FIG. 2, splices 38 between the conductors are then made to electrically connect one cable to the other. Only four splices are shown in FIG. 2 for clarity. Groups of the splices are then chosen. A first group of splices is to be laid upon the cable 12 and sealed into position before subsequent groups. To seal the first group of splices in position, a layer of deformable sealing material is positioned to extend across the windings 34 of vinyl tape into contact with the jacket of the cables. This sealing material which is ethylene-propylene rubber sealing tape is formed as layer 36 by overlapped windings and the conductors are then laid over the layer 36 as shown by FIG. 3 to locate the splices 38 of the first group upon the layer, possibly towards the end of the grounding bar 26 and support means 32 on the cable 12. A further layer 40 of the compressible sealing tape is then formed by overlapped windings and these windings completely overlay the layer 36 so as to enclose between the layers the conductors extending from the gap between the cables and also the splices themselves.

A layer 42 of resilient sealing tape is then wrapped around the layer 40 in a localized axial position, i.e. so as to lie radially outward of a portion of the conductors 14 and 16 passing axially along the cable 12 to the first group of splices. This layer of resilient tape material is of any suitable material for the purpose of permanently compressing the ethylene-propylene tape material. A requirement for the resilient tape material is that it may be stretched sufficiently so as to apply a degree of compression to the layers 40 and 36 to cause their permanent deformation under the compressive force. A suitable material for the layer 42 includes a tape referred to throughout the telecommunications cable industry as "DR tape", or a neoprene rubber tape. Subsequent groups of splices are then located around the cable 12 in the manner discussed above with each of the splices in each group being circumferentially spaced from others in the group. The second group of splices is laid around the cable core, possibly slightly axially spaced from the previous group. The splices 38 in the second group are contained between layers 46 and 48 of ethylene-propylene rubber tape material which are wound upon the previous layers as described. It may be possible to dispense with the layer 46 so that the splices 38 lie directly upon the layer 40. Once the splices 38 are located in position and have sealing material around them then a further layer 50 of the resilient tape material is wrapped tightly around the layer 48 so as to overlie in a localized area, the conductors leading to the splices 38. The material of the layers 42 and 50 should be stretched sufficiently so that the width of the tape decreases to approximately 0.75 of its original unstretched width.

The above process for laying the conductor splices is then continued with the splices in groups until all the splices have been laid in position and have sealing material around them.

It is important to ensure that all of the conductors to all of the splices are sealed to their surrounding sealing material by the resilient tape layers such as 42 and 50 so as to prevent moisture ingress along the conductors to the splices. The number of splices per group does of course relate to the circumferential distance around the cable and is related therefore to the cable diameter. It has been found that the groups may be formed conveniently of up to 100 splices per group and these may be applied in succession in the manner described around a single cable end while sealing each group in turn.

It is also important to ensure in a preferred arrangement that the splices all lie axially along the extent of the grounding bar 26 and rigid support bar 32 so that they lie within the encapsulated region which is rigidified by the bars and by the vinyl tape 34.

Figure 4:
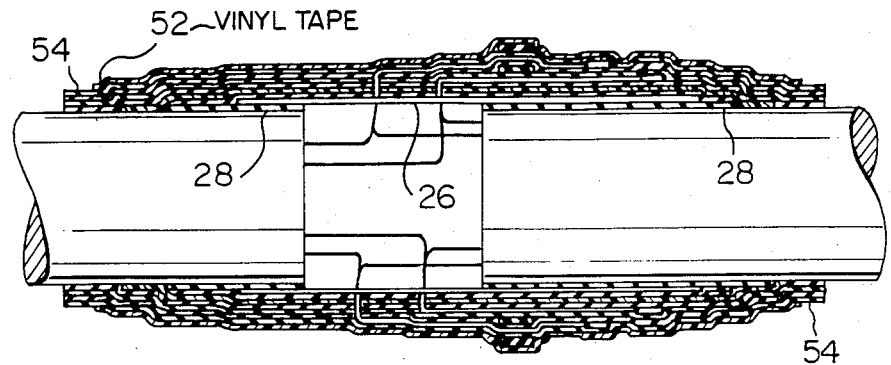
Figure 5:
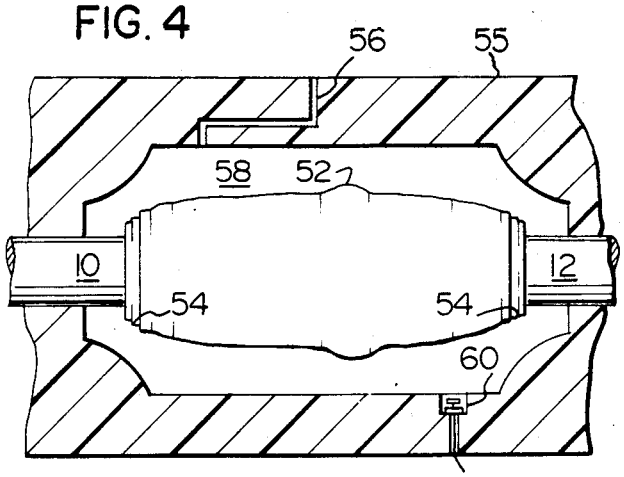
FIG. 5 is a side elevational view of a partly finished cable joint located within a mold for providing an encapsulation.
Figure 6:
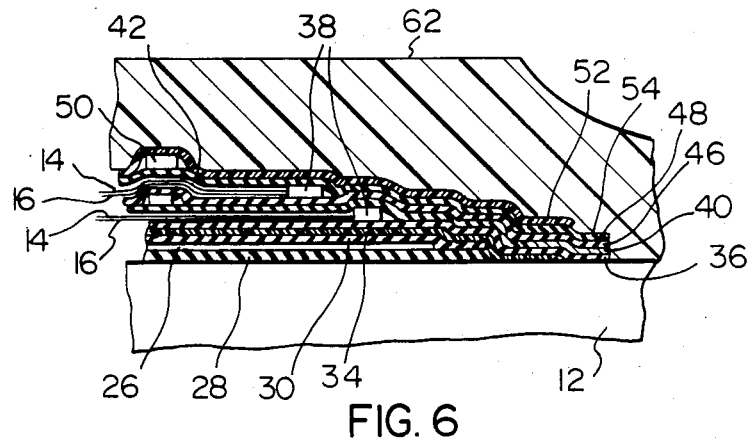
FIG. 6 is a detailed view of part of the finished encapsulated splice region of the two cable ends and on a larger scale than the other figures.

After the splices have all been located in their positions as shown by FIG. 3, each has been enclosed within its own sealing material provided by the ethylene-propylene rubber tape and the resilient tape material has been wrapped around the layers for each splice group as is required, then the splice region is completed by an encapsulation. The encapsulation is preceded however by disposing a barrier material around the windings of ethylene-propylene rubber tape. This barrier material may extend completely from end-to-end of the previous windings so as to lie upon the cable jackets at each end. However, in a preferred form and as shown in FIGS. 4 and 5 the barrier material 52 terminates axially short of the ends of previous windings of ethylene-propylene rubber, to provide a short exposed region 54 which may be about 0.5 inches wide, for contact by the encapsulating material which is to be applied. The barrier material may itself be vinyl. The splice assembly as shown in FIG. 4 is then located within a mold comprising mold halves 55 (FIG. 5). Only one of these is shown as the view is taken on the parting line of the mold. Moldable material is extruded through inlet gate 56 into the mold cavity 58 to mold the encapsulation with polyethylene material. The polyethylene flows through the mold and fills the cavity and completely encloses the vinyl layer 52. Upon the mold becoming full of material, it switches off automatically by the use of a switch means 60 which is operated automatically. This switch is described in detail in copending Canadian Patent application Ser. No. 395,552 filed Feb. 4, 1982 in the name of L. J. Charlebois et al. and entitled "MOLDING OF PLASTICS ARTICLES". Plastic flows through an overflow port and the injection equipment is shut off by the switch for field use.

It is a requirement of the present invention that the ethylene-propylene rubber tape layers should be softened sufficiently to cause them to merge together while also ensuring that the production of toxic gases is minimized. The temperatures for molding are therefore carefully controlled so that fusion will take place between the molding material and the jackets for the cables. In this embodiment, the jacket material is basically polyethylene and it is intended to use a different grade of polyethylene for the molding operation. A required temperature for the molding material is below 204° C. and preferably between 160° C. and 190° C. as the molding material enters the mold. It has been found that with a molten temperature set at about 190° C. immediately before the molding material enters the mold, this provides a molten temperature of about 145° C. (maximum) when contacting the cable jacket in a suitably designed aluminum mold which is water cooled to a temperature of around 20° C. Under such controlled conditions, no fusion takes place between the two different polyethylene materials used for the plastic moldings and the cable jacket. The degree of heat retention, which is related of course to the rate of heat dissipation, is also an important factor and this is dependent upon the type of material used for the mold and the temperature to which it is cooled.

In addition to the fact that the molding temperature is such that a fusion bond does not take place between the plastic molding 62 forming the encapsulation and the cable jacket, the resilient material in each of the layers 42 and 50 is not heated sufficiently to soften it which would otherwise cause it to relax from its stretched condition. In contrast to this, the heat retention and the temperature of molding is sufficiently high for a fusion bond to take place between the ethylene-propylene rubber layers and between these layers and the molding at any interfacial region between them such as occurs along the region 54 at each end of the encapsulation. Seals are therefore formed at regions 54.

Hence it follows that the ethylene-propylene rubber layers which contact each other are merged into a single mass completely surrounding each individual splice and also surrounding the conductors where these pass through between the layers. Thus, although the molding 62 is not bonded to the jackets, moisture cannot reach the splices 38. In addition to this, the sealing material completely surrounds the grounding bar and the support means 32 so that moisture cannot move along the surfaces of these members. Should moisture reach the conductors as they emerge from the cable ends, it cannot pass along the interfacial regions between the insulation on the conductors and the ethylene-propylene rubber because the resilient tapes 42 and 50 are in a permanently stretched condition and hold the ethylene-propylene rubber in a permanently compressed sealing contact with the conductors in a localized axial region as they extend towards the splices. Thus a perfect seal is formed around every conductor radially inwards of its respective tape 42 or 50. It follows therefore that whether or not the cable which has been provided with the encapsulated splice region is of large or small diameter, an extremely efficient moisture proof seal is provided to prevent moisture from reaching any of the splices provided within the encapsulated splice region.

What is claimed is:

1. A method of forming an encapsulated splice region joining two cable ends comprising:
   removing core surrounding material from end regions of two cables to provide end portions of core surroundng material and cable core regions projecting axially a certain distance beyond said end portions;
   turning the conductors of said core regions so that they extend radially outwards from the cables;
   locating the cable end portions and the end portions of core surrounding material close together and substantially in axial alignment with the conductors projecting from between the end portions;
   connecting shields of the two cables together with a rigid axially extending grounding means and enclosing the grounding means within a seal;
   surrounding the seal and the end portions of core surrounding material with a layer of stiffening material with conductor ends projecting radially beyond the stiffening material;
   with the conductor ends electrically connected together to form splices from one cable to the other, individually enclosing each splice within a compressible deforamble sealing material which extends over the stiffening layer and onto the outer surface of each cable at each end of the stiffening layer and with the splices located radially outwards of the core surrounding material;
   applying a layer of a resilient tape material around the deformable sealing material in a position over a portion of the conductors as they extend from their splices axially along the end portions of core surrounding material, the resilient tape material being longitudinally stretched as it is being applied to radially compress the compressibly deformable sealing material into intimate sealing contact with each conductor; and
   forming a plastic molding encapsulation around the deformable sealing material and resilient tape material, and over cable portions at each axial end of the deformable sealing material, the encapsulation formed at a temperature insufficient to cause the resilient tape material to relax from its stretched condition.

2. A method according to claim 1, wherein the compressible deformable sealing material is formed by first and second layers of wrapped tape of the material, the first layer applied over the stiffening layer by overlapped wrappings of the tape, the splices then being placed in spaced positions upon the first layer, and the second layer being formed as overlapped tape wrappings over the first layer.

3. A method according to claim 2, wherein the deformable sealing material is a heat softenable material and the method comprises using the heat of molding of the encapsulation to soften the deformable sealing material to cause it to merge into an integral whole by the influence of heat obtained while encapsulating.

4. A method according to claim 1, comprising forming the seal surrounding the grounding means from overlapped wrappings of a heat softenable material around the cable end regions under the grounding means and further wrappings of heat softenable material over the grounding means.

5. A method according to claim 1, comprising locating a rigid elongate support means between the cables, the rigid support means displaced circumferentially around the cables from the grounding means and covered with a seal.

6. A method according to claim 5, comprising locating all the splices along an axial length of the two cables which is spanned by the grounding means and support means.

7. A method according to claim 3, wherein the core surrounding material has a softening temperature above that of the layers of deformable sealing material and the method comprises providing insufficient heat to cause bonding of the molding to the core surrounding material.

8. An assembly of two telecommunications cables disposed end-to-end with conductors of each cable core electrically connected each to one conductor of the other cable to form a conductor splice and in which:
   shields of the two cables are connected together with a rigid axially extending grounding means which is enclosed within a seal;
   a layer of stiffening material surrounds the seal and end portions of core surrounding material with conductors projecting radially beyond the stiffening material and having axially extending parts outside the end portion of at least one of the cables to dispose the splices radially outwards of core surrounding material with each splice individually closed within and sealed from other splices by a sealing material and with axially extending parts of the conductors enclosed within and sealed by said sealing material, said sealing material being compressibly deformable;
   a layer of resilient tape material is wrapped around the sealing material in a position radially outward of a portion of the axially extending parts of the conductors, the resilient tape material being in a stretched resilient condition circumferentially of the sealing material to apply a radially inwards compressive force upon the sealing material and hold it positively in sealing contact with said conductor parts; and
   a surrounding molded plastic encapsulation extends from the core surrounding material of one cable to the core surrounding material of the other.

9. An assembly according to claim 8, wherein the sealing material surrounding the splieces is merged into an integral whole.

10. An assembly according to claim 8, wherein the seal surrounding the grounding means is an integral whole.

11. An assembly according to claim 8, provided with a rigid elongate support means extending between the cables and spaced circumferentially around the cables from the grounding means, the support means also being covered by a seal.

12. An assembly according to claim 11, wherein all of the splices are located along an axial length of the cables which is spanned by the grounding means and support means.

13. An assembly according to claim 10, wherein the encapsulation and core surrounding material of the cables are unbonded.

* * * * *